(12) United States Patent
Janssen

(10) Patent No.: US 8,360,913 B2
(45) Date of Patent: Jan. 29, 2013

(54) DRIVE SYSTEM WITH AN 8-GEAR GEARBOX

(75) Inventor: Peter Janssen, Maasbracht (NL)

(73) Assignee: FEV GmbH, Aachen (DE)

( * ) Notice: Subject to any disclaimer, the term of this patent is extended or adjusted under 35 U.S.C. 154(b) by 305 days.

(21) Appl. No.: 12/811,426

(22) PCT Filed: Jan. 8, 2008

(86) PCT No.: PCT/EP2008/000069
§ 371 (c)(1),
(2), (4) Date: Jul. 1, 2010

(87) PCT Pub. No.: WO2009/086846
PCT Pub. Date: Jul. 16, 2009

(65) Prior Publication Data
US 2010/0282531 A1    Nov. 11, 2010

(51) Int. Cl.
*F16H 3/72* (2006.01)
(52) U.S. Cl. ............................................................ 475/5
(58) Field of Classification Search .................... None
See application file for complete search history.

(56) References Cited

U.S. PATENT DOCUMENTS

| | | | |
|---|---|---|---|
| 4,200,006 A | 4/1980 | Ehrlinger et al. | |
| 6,645,105 B2* | 11/2003 | Kima | 475/5 |
| 6,666,787 B2* | 12/2003 | Doepke | 475/5 |
| 7,311,630 B2* | 12/2007 | Borgerson | 475/215 |
| 7,575,529 B2* | 8/2009 | Holmes | 475/5 |
| 8,075,436 B2* | 12/2011 | Bachmann | 475/5 |
| 8,100,207 B2* | 1/2012 | Oba et al. | 180/65.285 |

FOREIGN PATENT DOCUMENTS

| | | |
|---|---|---|
| DE | 2452335 A1 | 5/1976 |
| EP | 1275547 A2 | 1/2003 |
| EP | 1367296 A1 | 12/2003 |

* cited by examiner

*Primary Examiner* — Dirk Wright

(74) *Attorney, Agent, or Firm* — Gifford, Krass, Sprinkle, Anderson & Citkowski, P.C.

(57) ABSTRACT

A drive system with an 8-gear gearbox for a motor vehicle with a driving machine 11, more particularly an internal combustion engine, comprising a distribution gearbox 12 which is drivingly connected to the driving machine 11 and comprises three members, as well as two 2-gear partial gearboxes 17, 18, wherein a first member of the distribution gearbox 12 is drivingly connected to the internal combustion engine 11 and the two other members of the distribution gearbox 12 are each connected to an input shaft 20, 28 of one of the two 2-gear partial gear-boxes 17, 18 and wherein, between two members of the distribution gearbox 12, there is provided a switchable bridging coupling 19 and wherein one output element of each of the two 2-gear partial gearboxes 17, 18 is permanently drivingly connected to a driven gear 38, 39 or to a driven shaft 40.

12 Claims, 18 Drawing Sheets

7th Gear

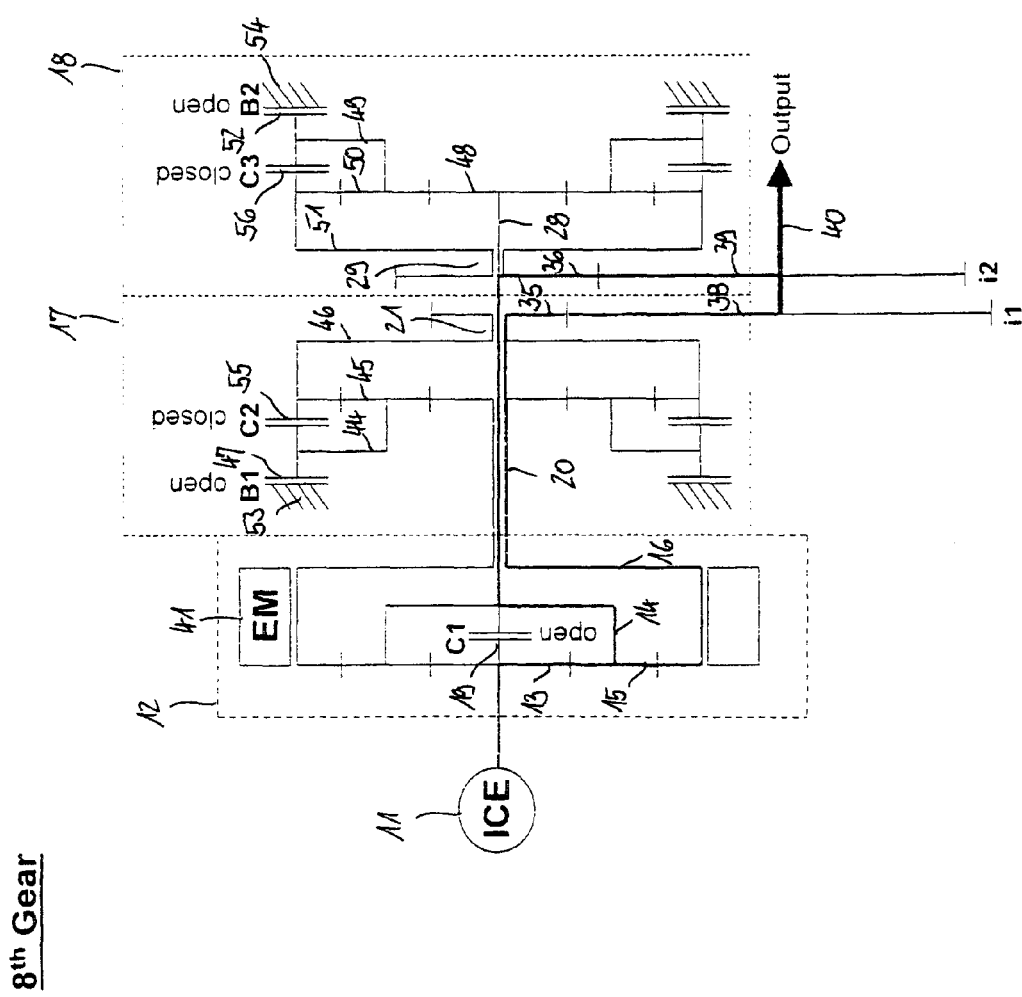

DRIVE SYSTEM WITH AN 8-GEAR GEARBOX

CROSS REFERENCE TO RELATED APPLICATIONS

This application is the U.S. national phase of PCT/EP2008/000069 filed Jan. 8, 2008, the entirety of which is incorporated herein by reference.

FIELD OF THE INVENTION

The invention relates to a drive system with an 8-gear gearbox for a motor vehicle with a driving machine, more particularly an internal combustion engine.

BACKGROUND OF THE INVENTION

Gearboxes with an increasing number of gear stages are required on the one hand as a result of an increase in maximum speeds of vehicles and on the other hand as a result of the demand for advantageous consumption figures, which make it necessary to operate the internal combustion engine at all driving speeds at consumption-advantageous numbers of revolution and loads.

In addition to the above-mentioned requirements, there exists the desire for a higher degree of driving comfort which can be achieved with gear-changing procedures without interrupting the traction force; typically, this can be achieved by using double-coupling gearboxes.

It is therefore the object of the invention to provide a gearbox with eight gears which is characterised by a simple and compact design and a limited number of gear shifting elements.

SUMMARY OF THE INVENTION

The objective is achieved by proving a drive system with an 8-gear gearbox for a motor vehicle with a driving machine, more particularly an internal combustion engine, comprising a distribution gearbox which is drivingly connected to the driving machine and comprises three members, as well as two 2-gear partial gearboxes, wherein a member of the distribution gearbox is drivingly connected to the internal combustion engine and the two other members of the distribution gearbox are each connected to an input shaft of one of the two 2-gear partial gearboxes and wherein, between two members of the distribution gearbox, there is provided a switchable bridging coupling and wherein one output element of each of the two 2-gear partial gearboxes is permanently drivingly connected to a driven gear or to a driven shaft.

With a view to achieving a short and simple design, it is proposed more particularly that the distribution gearbox is a planetary gearbox which, in the form of rotating members coupled to one another, comprises a sun gear, a planetary carrier with at least one planetary gear and a hollow gear. In a typical application the switchable bridging and lock-up coupling is arranged between the sun gear and the planetary carrier. If the bridging and lock-up coupling is closed, the distribution gearbox acts as rigid through-drive, whereas, if the bridging and lock-up coupling is open, a differential movement takes place in the distribution gearbox. This can be regarded as a gear stage if one of the members of the differential gearbox is fixed.

For designing the two partial gearboxes, there will be made two proposals which are both characterised by a simple and short design.

According to a first proposal, it is proposed that the two-gear partial gearboxes each constitute shift gearboxes with switchable gears with an input shaft and with an output shaft extending parallel to the input shaft and with two gears each firmly connected to one of the shafts and with two gears which are individually switchably connected to the other one of the shafts. Gearboxes of said type can, in the usual way, constitute two gearbox stages. In addition, it is possible to move a switchable element for the switchable gears into a neutral position in order to interrupt the torque flow between the input shaft and the output shaft.

This makes it possible to change gears in all gear stages without interrupting the traction force, with the switchable bridging coupling being engaged. Furthermore, when switching into some of the higher gears, a limited support for the traction force is ensured by some released mass moments of inertia.

According to a further proposal, the two-gear partial gearboxes constitute switchable planetary gearboxes with the following members: a sun gear, a planetary carrier with at least one planetary gear and hollow gear, wherein one of the members is connected to an input shaft, one of the members to an output shaft and the third member to a brake disc/brake carrier which can be fixed relative to a stationary part, and wherein, between the two members of the planetary gearbox, there is provided a switchable bridging coupling. If the bridging and lock-up coupling is opened and the brake closed, the planetary gearbox constitutes a gear stage between the input shaft and the output shaft. If the bridging or lock-up coupling is closed and the brake opened, there is obtained a rigid through-drive from the input shaft to the output shaft. If both of said components are opened, i.e. the bridging or lock-up coupling and the brake, the connection between the input shaft and the output shaft is uncoupled in the torque flow.

As only load switch couplings are used, with a maximum of two gear changing elements being engaged in each gear, switching without interrupting the traction force is also possible.

For both the above-mentioned proposals it is advantageous if one of the input shafts in an inner shaft and the other input shaft is a hollow shaft extending coaxially relative thereto.

According to the first proposal (gearbox with switchable gears), the output shafts can form different planes with the input shafts. According to the second proposal (planetary gearbox) the output shafts both extend coaxially relative to the input shafts.

According to an advantageous further development, the drive system of the above-described type can be supplemented to form a hybrid drive system with an secondary driving machine. Said secondary driving machine, more particularly, can be coupled to one of the members of the distribution gearbox or to one of the input shafts of the partial gearbox.

In a distribution gearbox provided in the form of a planetary gearbox, the secondary driving machine can be an annular electric motor which is connected to the hollow gear. In such a hybrid drive system, there is no need for a separating coupling between the internal combustion engine and the input shaft for the distribution gearbox.

By converting the inventive drive system into a hybrid drive system, there are achieved the known options for operating the vehicle equipped with such a hybrid drive system such as starting and driving entirely electrically, energy recuperation (converting kinematic vehicle energy into electric energy), pre-synchronisation of the drive-shafts prior to gear changing, traction-force-free gear changing, starting the internal combustion engine with the secondary driving machine while the vehicle is stationary or during electric driving.

Further advantageous embodiments are described in the sub-claims to the contents of which reference is hereby made.

The different operating conditions of the drive system are more easily understood with reference to the following description of the drawings.

BRIEF DESCRIPTION OF THE DRAWINGS

Two preferred embodiments of the invention are illustrated in the drawings and will be described below.

FIG. 18 is the gearbox diagram according to FIG. 10 in the $8^{th}$ gear.

DETAILED DESCRIPTION OF THE INVENTION

Figure 1:
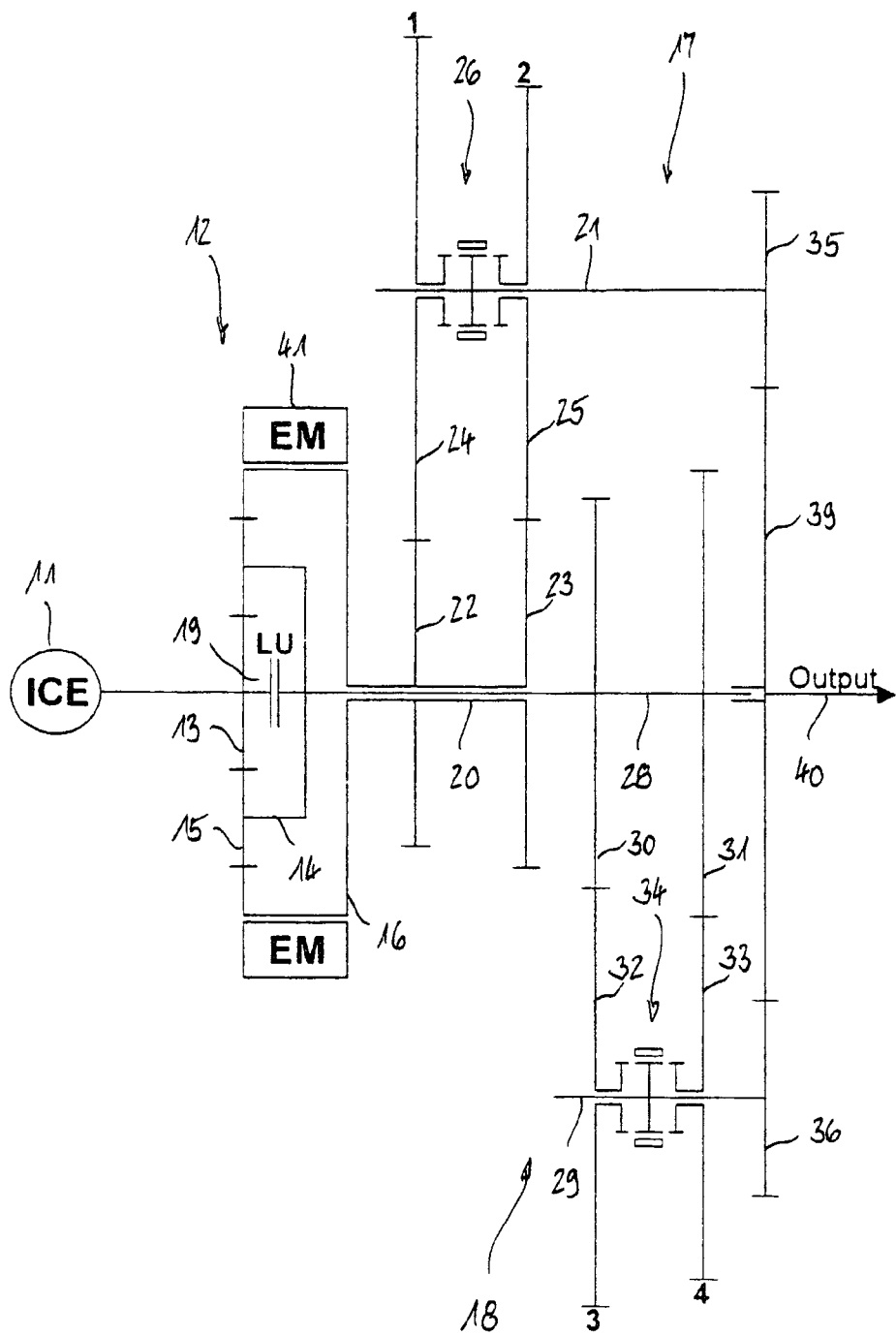
FIG. 1 is the gearbox diagram of an inventive hybrid drive system in a first embodiment in the neutral position.

FIG. 1 shows the gearbox diagram of an inventive drive system in the form of a hybrid drive system in a first embodiment. The following description of FIG. 1, in principle, also applies to FIGS. 2 to 9 which show different gear change conditions of the gearbox diagram according to FIG. 1.

The drive system comprises a main driving machine 11, in this case in the form of an internal combustion engine, a distribution gearbox 12 in the form of a lockable planetary gearbox, as well as two 2-gear partial gearboxes 17, 18, each in the form of a 2-gear stepped manual gearbox. The planetary gearbox 12 comprises the following members: a sun gear 13 which is connected to the crankshaft of the driving machine 11 in a rotationally fast way, a planetary carrier 14 with planetary gears 15, as well as a hollow gear 16. The hollow gear 16 is connected to an input shaft 20 of the first partial gearbox 17 in rotationally fast way, which input shaft 20 is provided in the form of a hollow shaft. The planetary carrier 14 is connected in a rotationally fast way to an input shaft 28 of the second partial gearbox 18, which input shaft 28 is provided in the form of an inner shaft arranged coaxially relative to the input shaft 20.

The planetary gearbox 12 can be replaced by any other distribution gearbox or differential gearbox. In accordance with the invention, the distribution gearbox contains a lock-up coupling 19 which is able to couple the sun gear 13 to the planetary carrier 14. i.e. the crankshaft of the internal combustion engine 11 to the input shaft 28 of the second partial gearbox. The hollow gear 16, as the third member of the distribution gearbox 12, is coupled to a secondary driving machine 41 which, in this case, is provided in the form of an annular electric machine.

Apart from the input shaft 20 which carries two fixed gears 22, 23, the first partial gearbox 17 comprises an output shaft 21 which carries two switchable gears 24, 25 (loose gears) which, optionally, can be coupled by a switching unit 26 to the output shaft 21. The switching unit can comprise a fixed gear connected to the output shaft and a switching muff by means of which the loose gears are optionally connected to said fixed gear. Furthermore, on the output shaft 21 there is arranged an output gear 35 which engages a driven gear 39 on the driven shaft 40. In addition to the input shaft 28 which carries two fixed gears 30, 31, the second partial gearbox 18 comprises two fixed gears 30, 31, an output shaft 29 on which there are arranged two switchable gears 32, 33 (loose gears) which by means of a switching unit 34 can optionally be coupled to the output shaft 29. The switching unit can comprise a fixed gear connected to the output shaft 29 and a switching muff by means of which the loose gears can optionally coupled to said fixed gear. Furthermore, the output shaft 29 of the second partial gearbox 18 carries an output gear 36 which also engages the driven gear 39 of the driven shaft 40.

The following illustrations show eight different gear shift conditions of which four are illustrated by opening the lock-up coupling 19 and four by closing the lock-up coupling. In the former case the distribution gearbox retains its distribution function, whereas in the latter case it forms a rigid bridge from the input end to the blocked parts of the output end (planetary carrier and hollow gear). In all gear shift conditions, there is shown the boost function of the hybrid drive system, i.e. the secondary driving machine 41 additionally transmits torque to the driveshaft 40 (driven shaft).

Figure 2:
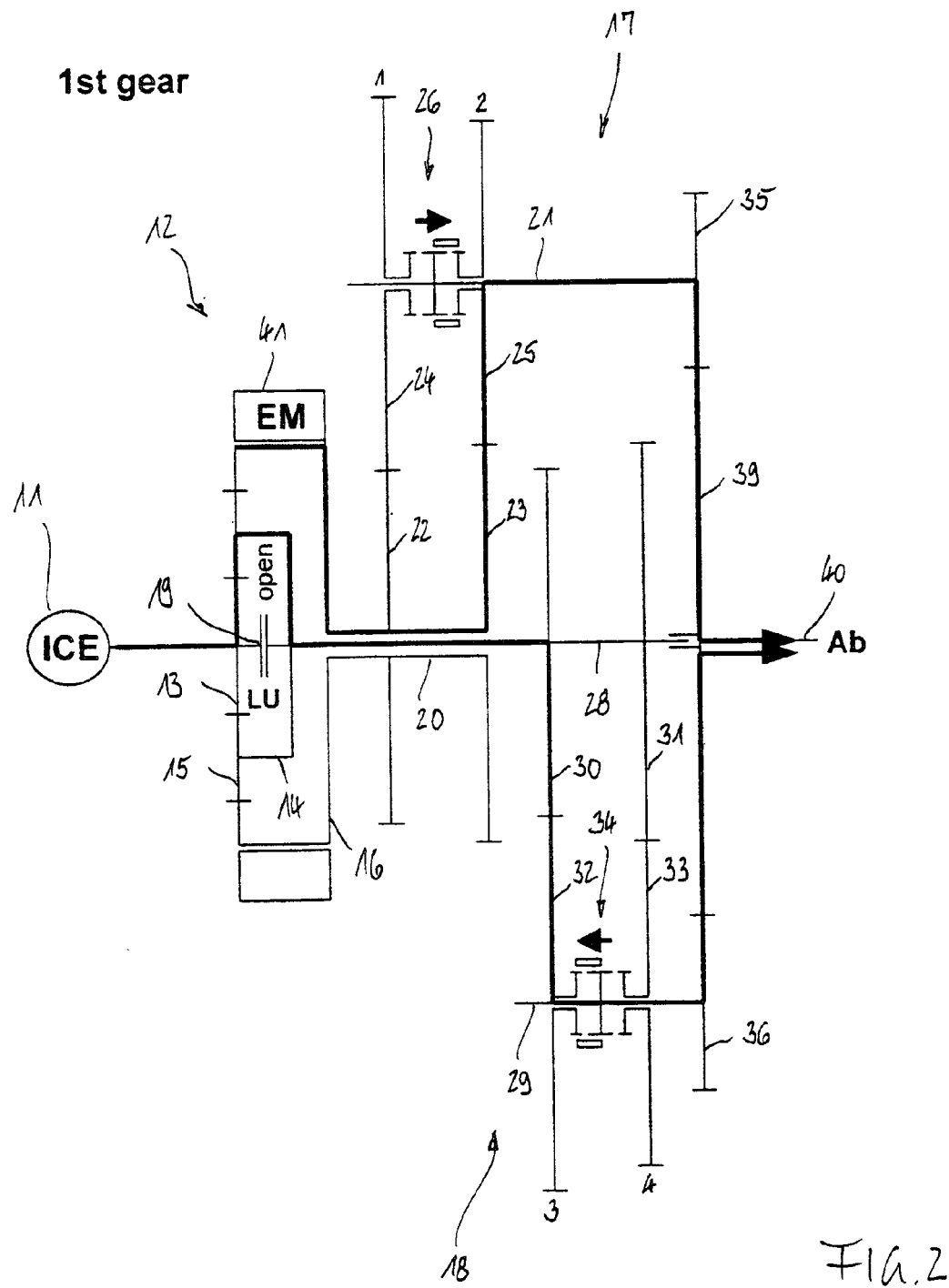
FIG. 2 is the gearbox diagram according to FIG. 1 in the $1^{st}$ gear.

FIG. 2 shows the gear shift condition in the first gear in which the lock-up coupling is open. In the first partial gearbox 17, the switching muff of the switching unit 26 is displaced to the right for the purpose of coupling the switching gear 25 to the output shaft 21. In the second partial gearbox 18, the switching muff of the switching unit 34 is displaced to the left for the purpose of coupling the switching gear 32 to the output shaft 29. Via the sun gear 13 and the planetary carrier 14 torque is transmitted from the internal combustion engine 11 via the input shaft 28 and the pair of gears 30, 32 to the output shaft 29. Via the hollow gear 16, torque is transmitted from the secondary driving machine 41 and the input shaft 20 and the gears 23, 25 to the output shaft 21. Both output shafts 20, 28 thus transmit torque into the driven shaft 40. The differential movement of the distribution gearbox 12 is determined by the speed ratio between the gears 23, 30 because the output gears 35, 36, while being of identical size, rotate at the same speed.

Figure 3:
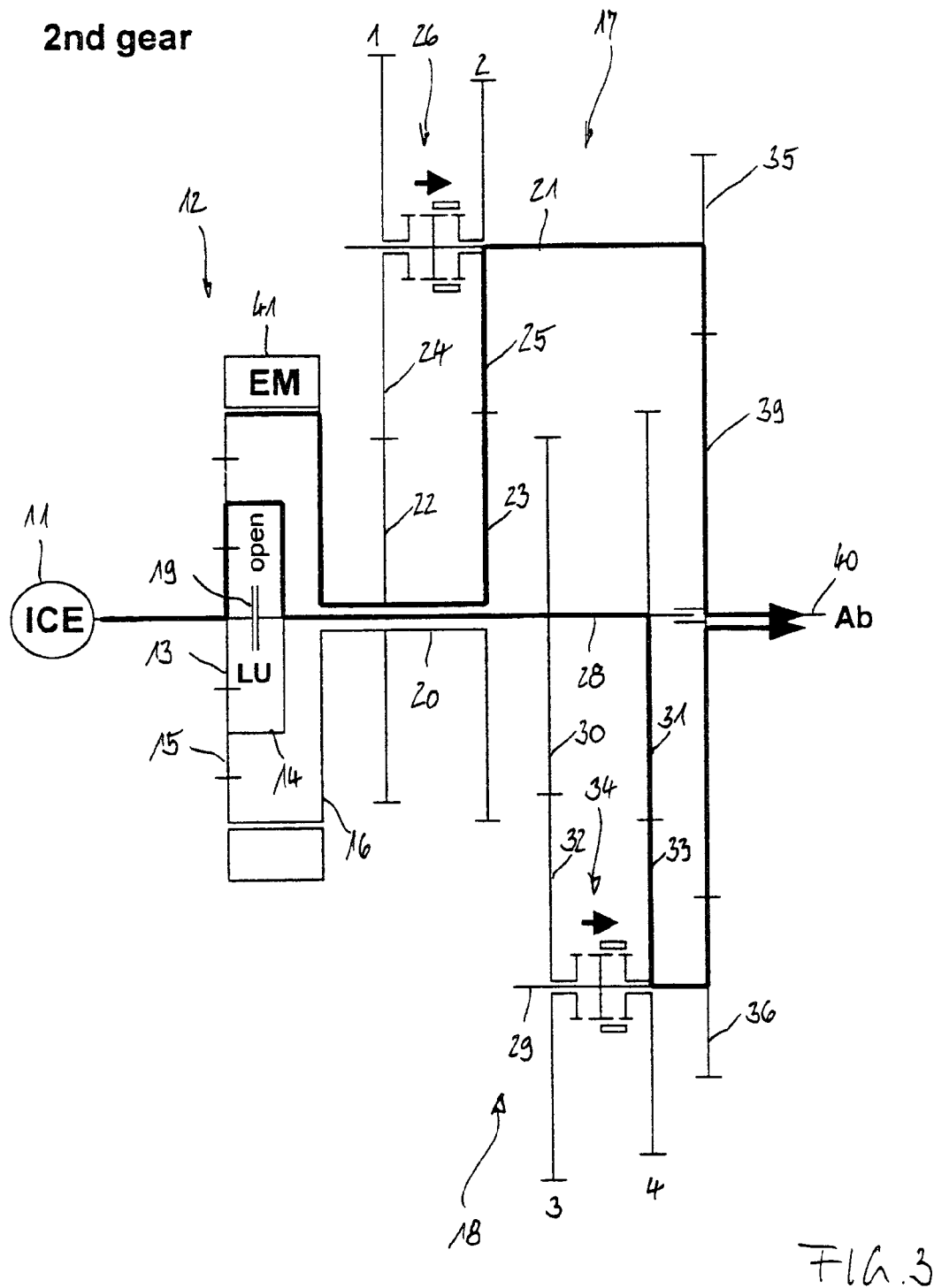
FIG. 3 is the gearbox diagram according to FIG. 1 in the $2^{nd}$ gear.

FIG. 3 shows the gear shift condition in the second gear wherein the lock-up coupling 19 is open. In the first partial gearbox 17, the switching muff of the switching unit 26 is displaced towards the right, so that the switching gear 25 is connected to the output shaft 21 of the first partial gearbox 17, and the switching muff of the switching unit 34 in the second partial gearbox 18 is displaced towards the right, so that, in deviation from the first gear, the switchable gear 33, in the second gear, is connected to the output shaft 29 of the second partial gearbox 18. Torque is thus transmitted from the driving machine 11 via the sun gear 13 and the planetary carrier 14 to the input shaft 28 and via the pair of gears 31, 33 to the output shaft 29 of the second partial gearbox 18, whereas the input shaft 20 is torque-loaded by the secondary driving machine 41 with the hollow gear 16, and the output shaft 21 of the first partial gearbox 17 is torque-loaded via the pair of gears 23, 25. The differential movement of the differential gearbox is determined by the speed ration between the gears 23 and 31.

Figure 4:
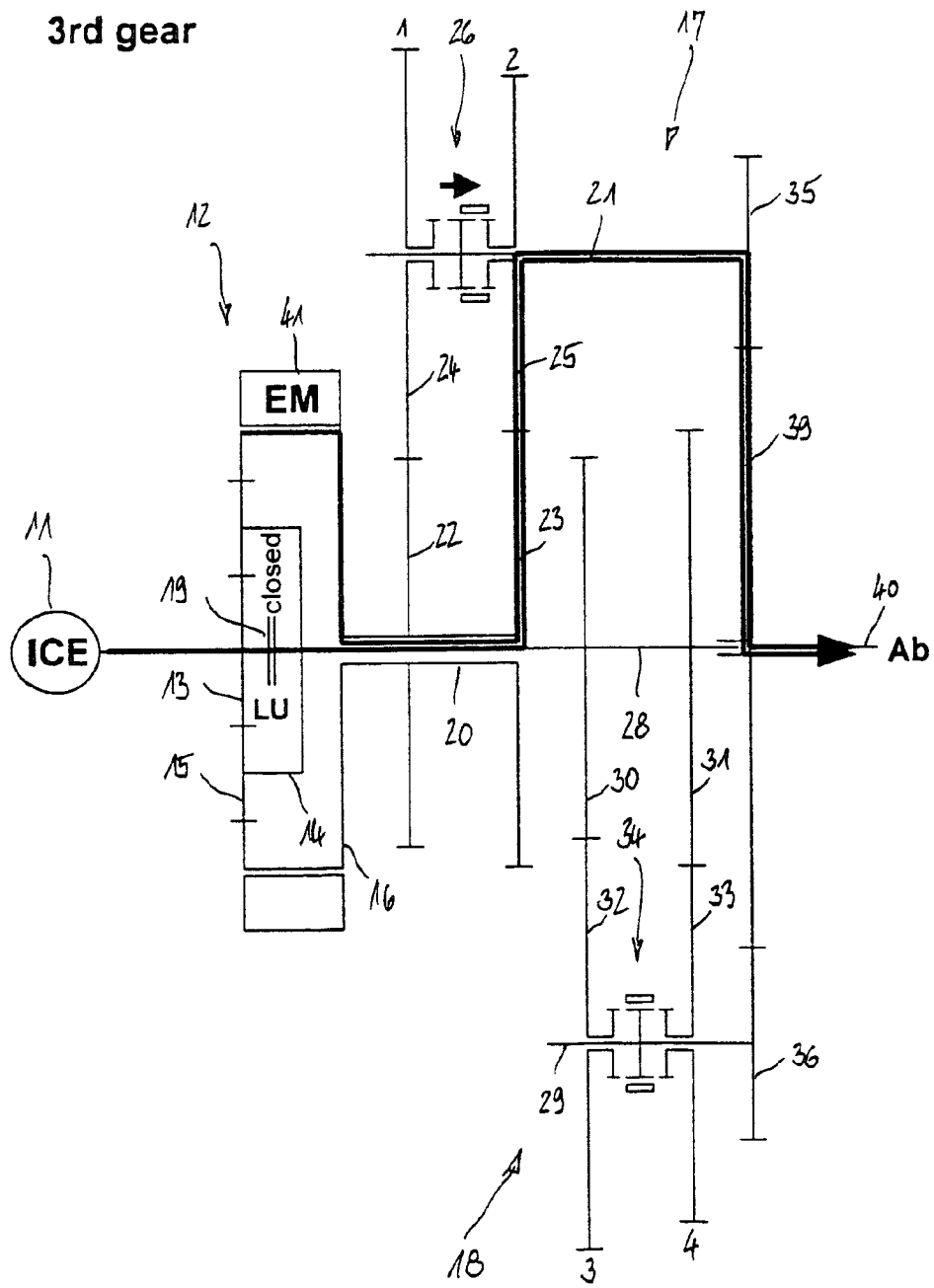
FIG. 4 is the gearbox diagram according to FIG. 1 in the $3^{rd}$ gear.

FIG. 4 shows the gear shift condition of the third gear wherein the lock-up coupling 19 is closed. As now no differential movements can take place at the distribution gearbox 12, only one of the partial gearboxes, i.e. the first partial gearbox 17, can be used, whereas the second partial gearbox 18 is disconnected by displacing the switching muff of the switching unit 34 into the neutral position. Torque is thus transmitted entirely via the distribution gearbox 12, which has to be regarded as a rigid unit, into the input shaft 20, with both the main driving machine 11 and the secondary driving machine 41 being able to transmit torque. The switching muff of the switching unit 26 of the first partial gearbox has been displaced towards the right, so that the pair of gears 23, 25 of the partial gearbox 17 is effective.

Figure 5:
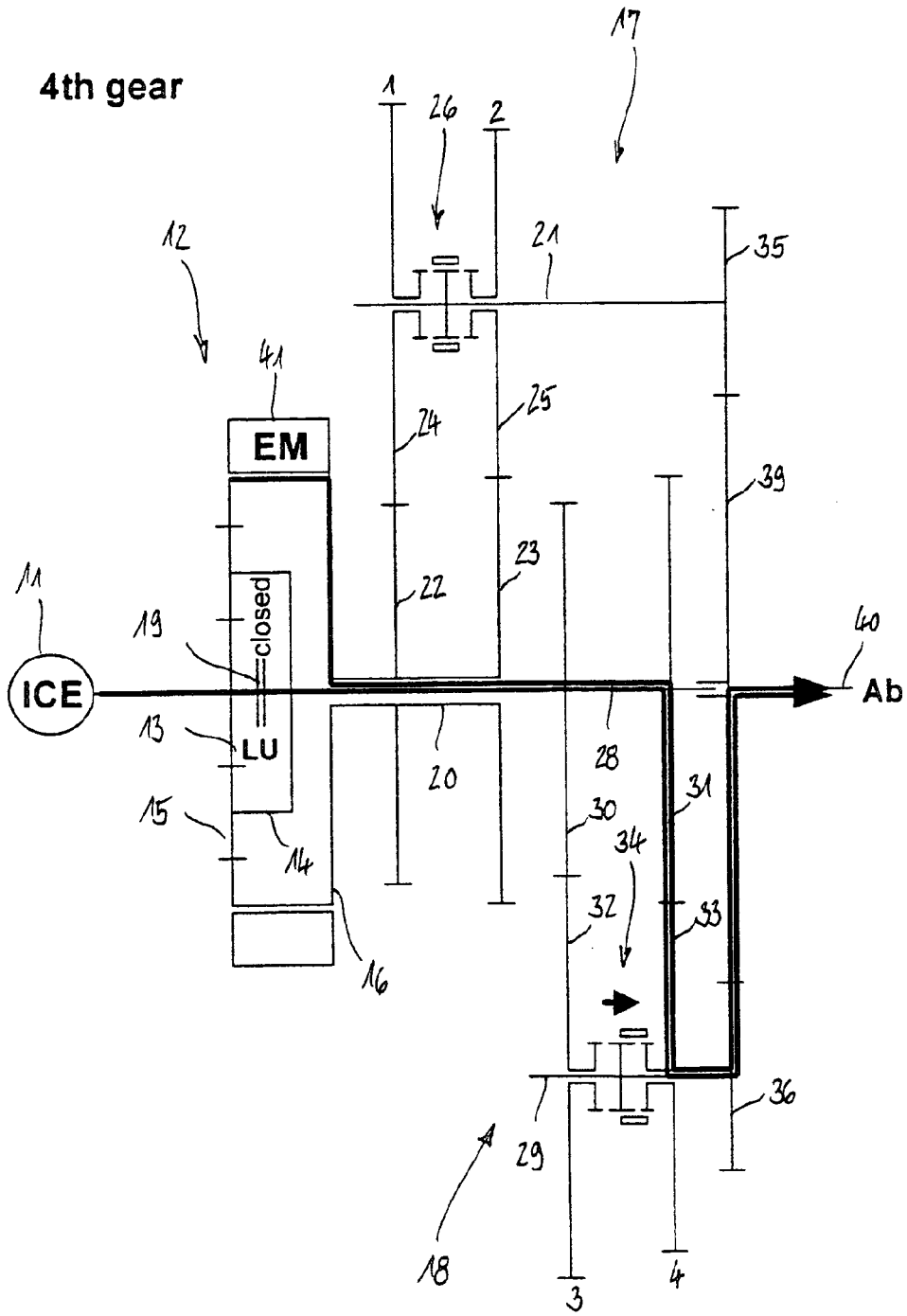
FIG. 5 is the gearbox diagram according to FIG. 1 in the $4^{th}$ gear.

FIG. 5 shows the gear shift condition of the fourth gear wherein the lock-up coupling 19 is closed. As now no differential movements can take place at the distribution gearbox 12, only one of the partial gearboxes, i.e. the second partial gearbox 18, can be used, whereas the first partial gearbox 17 is disconnected by displacing the switching muff of the switching unit 26 into the neutral position. Torque is thus transmitted entirely via the distribution gearbox 12, which has to be regarded as a rigid unit, into the input shaft 28, with both the main driving machine 11 and the secondary driving machine 41 being able to transmit torque. The switching muff of the switching unit 34 has been displaced towards the right, so that the pair of gears 31, 33 of the partial gearbox 18 is effective.

Figure 6:
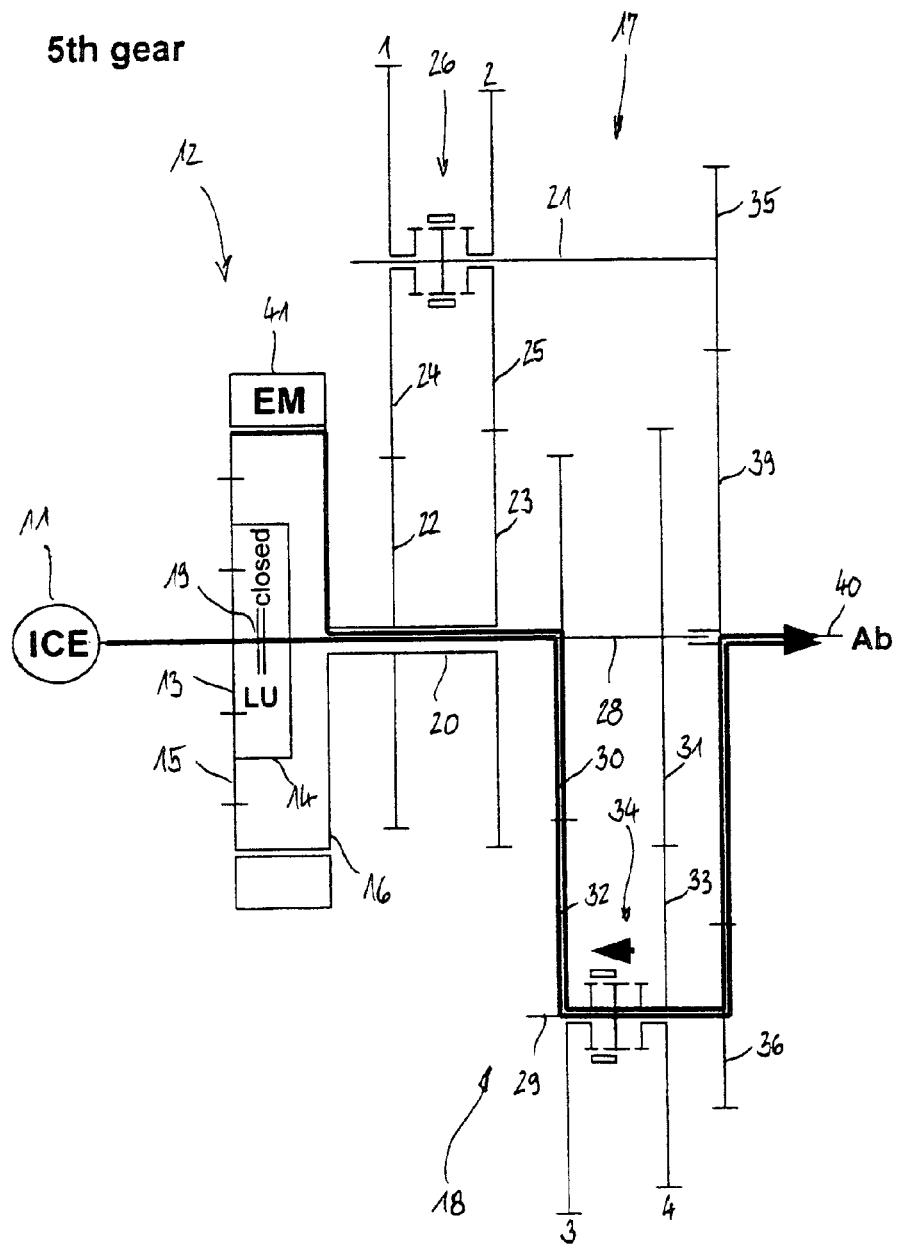
FIG. 6 is the gearbox diagram according to FIG. 1 in the $5^{th}$ gear.

FIG. 6 shows the gear shift condition of the fifth gear wherein the lock-up coupling 19 is closed. As, in consequence, no differential movements can take place at the distribution gearbox 12, only one of the partial gearboxes, i.e. the second partial gearbox 18, can be used, whereas the first partial gearbox 17 is disconnected by displacing the switching muff of the switching unit 26 into the neutral position. Torque is thus transmitted entirely via the distribution gearbox 12, which has to be regarded as a rigid unit, into the input shaft 28, with both the main driving machine 11 and the secondary driving machine 41 being able to transmit torque. The switching muff of the switching unit 34 has been displaced towards the left, so that the pair of gears 30, 32 of the partial gearbox 18 is effective.

Figure 7:
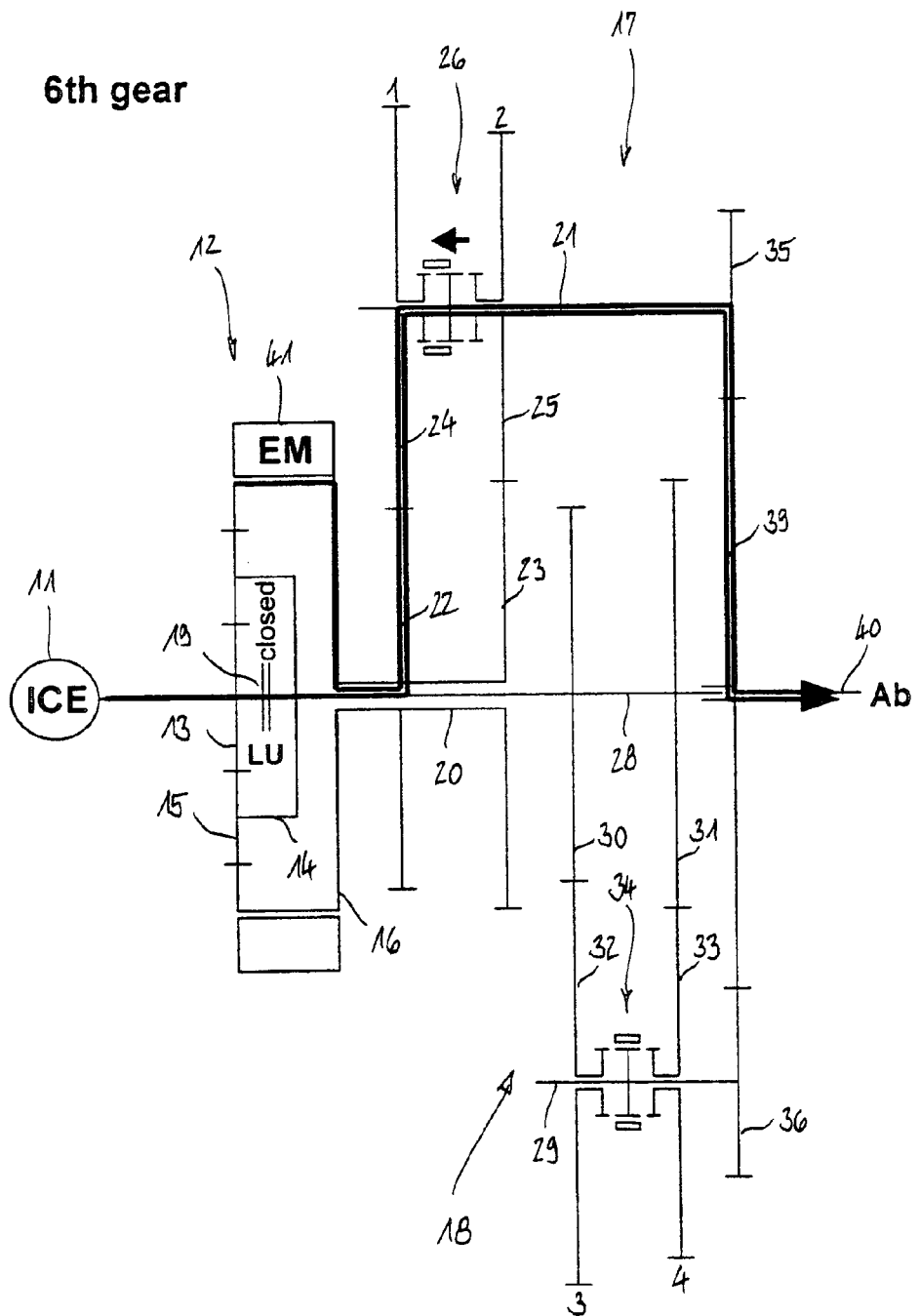
FIG. 7 is the gearbox diagram according to FIG. 1 in the $6^{th}$ gear.

FIG. 7 shows the gear shift condition of the sixth gear wherein the lock-up coupling 19 is closed. As, again, no differential movements can take place at the distribution gearbox 12, only one of the partial gearboxes, i.e. the first partial gearbox 17, can be used, whereas the second partial gearbox 18 is disconnected by displacing the switching muff of the switching unit 34 into the neutral position. Torque is thus transmitted entirely via the distribution gearbox 12, which has to be regarded as a rigid unit, into the input shaft 20, with both the main driving machine 11 and the secondary driving machine 41 being able to transmit torque. The switching muff of the switching unit 26 has been displaced towards the left, so that the pair of gears 22, 24 of the partial gearbox 17 is effective.

Figure 8:
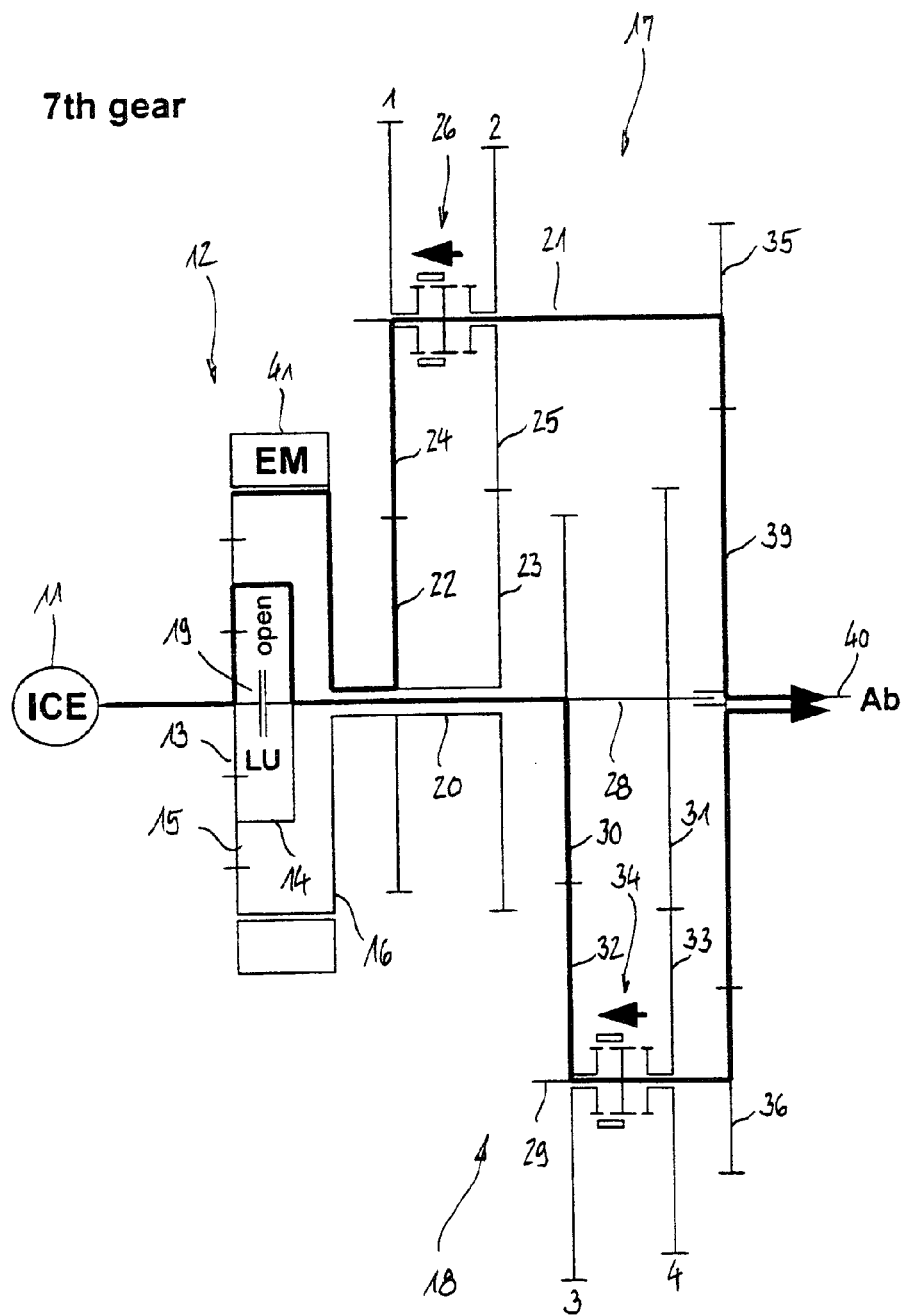
FIG. 8 is the gearbox diagram according to FIG. 1 in the $7^{th}$ gear.

FIG. 8 shows the gear shift condition of the seventh gear, with the lock-up coupling 19 being open. The switching muff of the switching unit 26 has been displaced towards the left, so that the switchable gear 24 is connected to the output shaft 21 of the first partial drive 17, and the switching muff of the switching unit 34 is displaced towards the left, so that the switchable gear 32 is connected to the output shaft 29 of the second partial gearbox. Torque is thus transmitted by the driving machine 11 via the sun gear 13 and the planetary carrier 14 to the input shaft 28 and via the pair of gears 30, 32 to the output shaft 29 of the second partial gearbox 18, whereas the input shaft 20 is torque-loaded by the secondary driving machine 41 with the hollow gear 16 and the output shaft 21 of the first partial gearbox is torque-loaded via the pair of gears 22, 24. The differential movement of the differential gearbox 12 is determined by the speed ratio between the gears 11 and 30.

Figure 9:
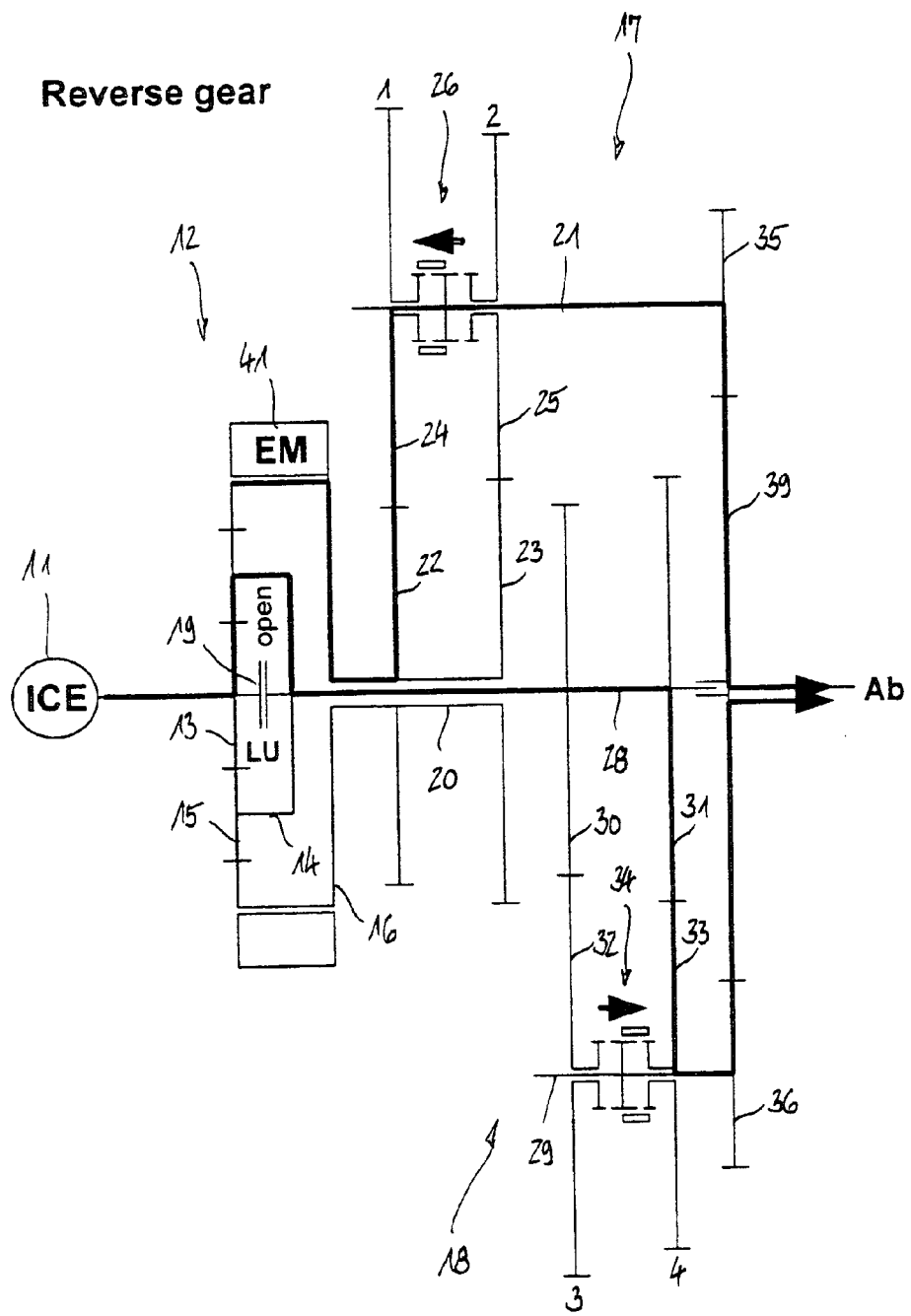
FIG. 9 is the gearbox diagram according to FIG. 1 in the reverse gear.

FIG. 9 shows the gear shift condition of a reverse gear, wherein the lock-up coupling 19 is open. The switching muff of the switching unit 26 is displaced towards the left, so that the switchable gear 24 is connected to the output 21 of the first partial gearbox 17, and the switching muff of the switching unit 34 is displaced towards the right, so that the switchable gear 33 is connected to the output shaft 29 of the second partial gearbox 18. Torque is transmitted by the driving machine 11 via the sun gear 13 and the planetary carrier 14 to the input shaft 28, and via the pair of gears 31, 33 to the output shaft 29 of the second partial drive 18, whereas the input shaft 20 is torque-loaded by the secondary driving machine 41 with the hollow gear 16, and via the pair of gears 22, 24, the output shaft 21 of the first partial gearbox 17 is torque-loaded. The differential movement of the differential gearbox in this case, is determined on the basis of the speed ratio between the teeth of the fixed gears 22 and 31. In this embodiment, the direction of rotation of the secondary driving machine 41 (electric machine) has to be reversed, and the speed ratio between the secondary driving machine and the main driving machine 11 (internal combustion engine) has to be selected to be such that, with an unchanged direction of rotation of the internal combustion engine, the direction of rotation of the main driving machine, too, has to be reversed. By maintaining the direction of rotation of the secondary driving machine, it is possible to create an eighth gear.

Figure 10:
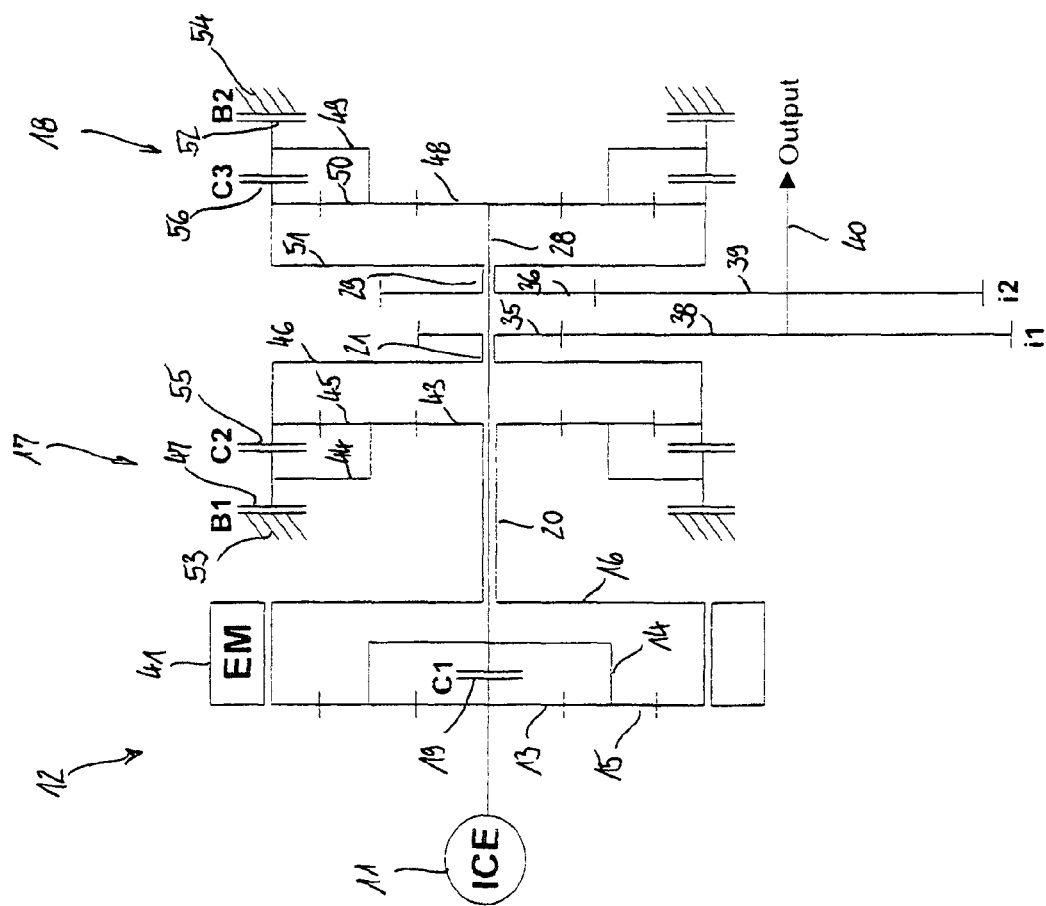
FIG. 10 is the gearbox diagram of an inventive hybrid drive system in a second embodiment in the neutral position.

FIG. 10 shows the gearbox diagram of an inventive drive system in the form of a hybrid drive system in a second embodiment. The following description of FIG. 10, in principle, also applies to FIGS. 11 to 18 which show different gear shift conditions of the gearbox diagram according to FIG. 10. The drive system comprises a main driving machine 11, in this case in the form of an internal combustion engine, a distribution gearbox 12 in the form of a lockable planetary gearbox, as well as two 2-gear partial gearboxes 17, 18, here in the form of special planetary gearboxes. The planetary gearbox 12 comprises the following members: a sun gear 13 which is connected to the crankshaft of the driving machine 11 in a rotationally fast way, a planetary carrier 14 with planetary gears 15, as well as a hollow gear 16. The hollow gear 16 is connected to an input shaft 20 of the first partial gearbox 17 in rotationally fast way, which input shaft 20 is provided in the form of a hollow shaft. The planetary carrier 14 is connected in a rotationally fast way to an input shaft 28 of the second partial gearbox 18, which input shaft 28 is provided in the form of an inner shaft arranged coaxially relative to the input shaft 20.

The planetary gearbox 12 can be replaced by any other distribution gearbox or differential gearbox. In accordance with the invention, the distribution gearbox contains a lock-up coupling 19 (C1) which is able to couple the sun gear 13 to the planetary carrier 14, i.e. the crankshaft of the internal combustion engine 11 to the input shaft 28 of the second partial gearbox. The hollow gear 16, as the third member of the distribution gearbox 12, is coupled to a secondary driving machine 41 which, in this case, is provided in the form of an annular electric machine (EM).

The first partial gearbox 17 which is driven by the input shaft 20 provided in the form of a hollow shaft is a planetary gearbox which comprises the following members: a sun gear 43, a planetary carrier 44 with planetary gears 45 and a hollow gear 46. Whereas the sun gear 43 is connected to the input shaft 20, the hollow gear 46 is connected to an output shaft 21 which is also provided in the form of a hollow shaft on which there is arranged an output gear 35 which engages a driven gear 38 on a driven shaft 40 (output). The second partial gearbox 18 is also a planetary gearbox and comprises the following members: a sun gear 48, a planetary carrier 49 with planetary gears 50 and a hollow gear 51. The sun gear 48 is connected to the input shaft 28, the hollow gear 51 to an output shaft 29 provided in the form of a hollow shaft, and carries an output gear 36 which engages a further driven gear 39 on the driven shaft 40.

In accordance with the invention, the first partial gearbox 17 is provided with a brake 47 (B1) which is able to brake the planetary carrier 44 relative to a fixed part 53 in order to support same and thus constitute a transmission stage between the sun gear 43 and the hollow gear 46. Furthermore, in the first partial gearbox 17, there is provided a coupling 55 (C2) which is able firmly to connect the planetary carrier 44 to the hollow gear 46, thus blocking the planetary gearbox, so that there takes place a direct transmission from the sun gear 43 to the hollow gear 46, i.e. from the input shaft 20 to the output shaft 21.

In accordance with the invention, the second partial gearbox 18 is provided with a brake 52 (B1) which is able to brake the planetary carrier 49 relative to a fixed part 54 in order to support same and thus constitute a transmission stage between the sun gear 48 and the hollow gear 51. Furthermore, in the second partial gearbox 18, there is provided a coupling 56 (C3) which is able firmly to connect the planetary carrier 49 to the hollow gear 51, thus blocking the planetary gearbox, so that there takes place a direct transmission from the sun gear 48 to the hollow gear 51, i.e. from the input shaft 28 to the output shaft 29.

The following Figures show eight different gear shift conditions of the above-described gearbox; in four cases thereof, the lock-up coupling 19 (C1) is open and the distribution gearbox 12 is thus able to have a differential function. In the four remaining cases, the lock-up coupling 19 of the distribution gearbox 12 is closed, so that the distribution gearbox 12 constitutes a through-drive only. Whereas in the first gear shift position torque can be transmitted via both partial gearboxes 17, 18, it is necessary in the second gear shift position to release one of the partial gearboxes 17, 18. Both partial gearboxes are subject to the condition that they each have to form a transmission stage when the respective lock-up coupling 55, 56 is open and when, as a result of the closed brake 47, 52, the planetary carrier 44, 49 is supported on the fixed part 53, 54, and that they act as a rigid through-drive when the respective lock-up coupling 55, 56 is closed, with the respective brake 47, 52 of the planetary carrier 44, 49 having to be opened.

If a partial gearbox has to be released, i.e. has to remain torque-free, both the lock-up coupling 55, 56 and the brake 47, 52 have to be opened.

Figure 11:
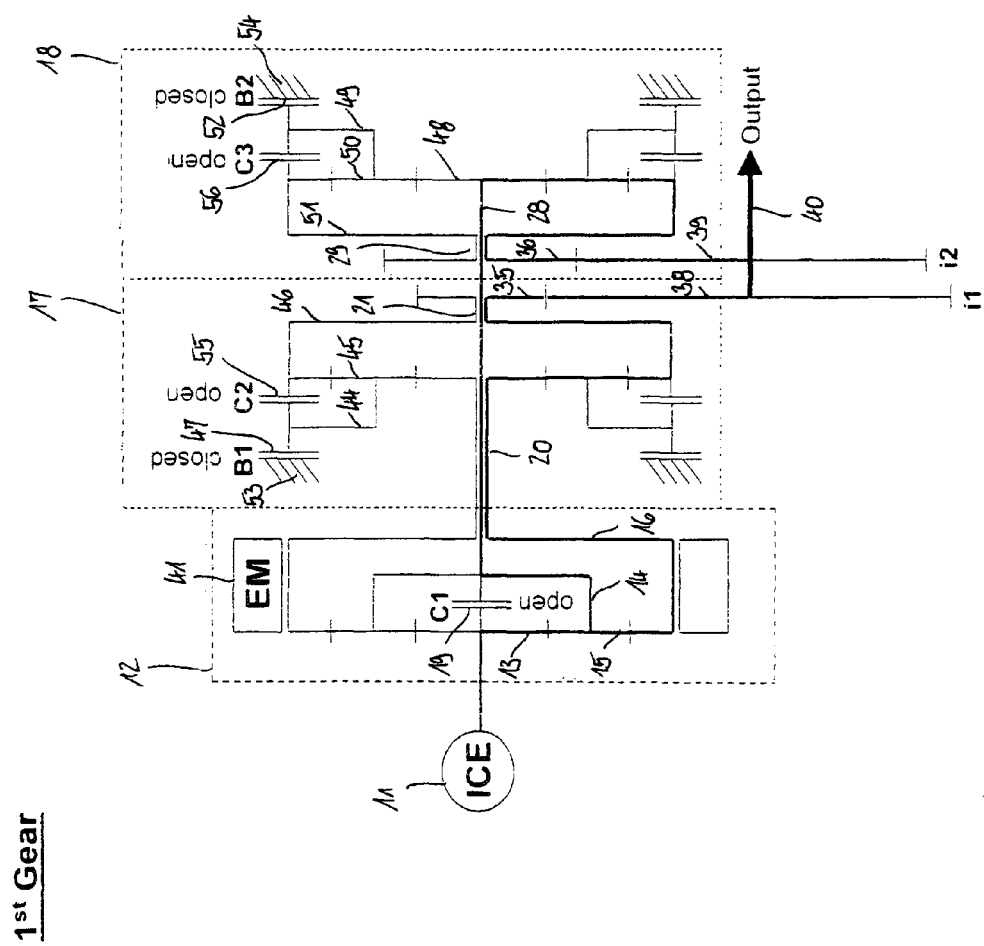
FIG. 11 is the gearbox diagram according to FIG. 10 in the $1^{th}$ gear.

FIG. 11 shows the gear shift condition for the first gear, wherein the lock-up coupling 19 of the distribution gearbox 12 is open. Torque is transmitted from the main driving machine 11 via the sun gear 13 and the planetary carrier 14 to the input shaft 28 of the second partial gearbox 18 which, with the lock-up coupling 56 being open and the brake 52 being closed, acts as a transmission stage and drives the output shaft 29 and the output gear 36 at a first speed, whereas torque continues to be transmitted from the secondary driving machine 41 via the hollow gear 16 to the input shaft 20 of the first partial gearbox 17 at which again the lock-up coupling 55 is open and the brake 47 closed, so that the partial gearbox 17, too, acts as a transmission stage and thus drives the output shaft 21 and thus the output gear 35 at a second speed. The speed ratio of the output gears 35, 36 determines the differential movement of the distribution gearbox 12 because the driven gears 38, 39 rotate at identical speeds.

Figure 12:
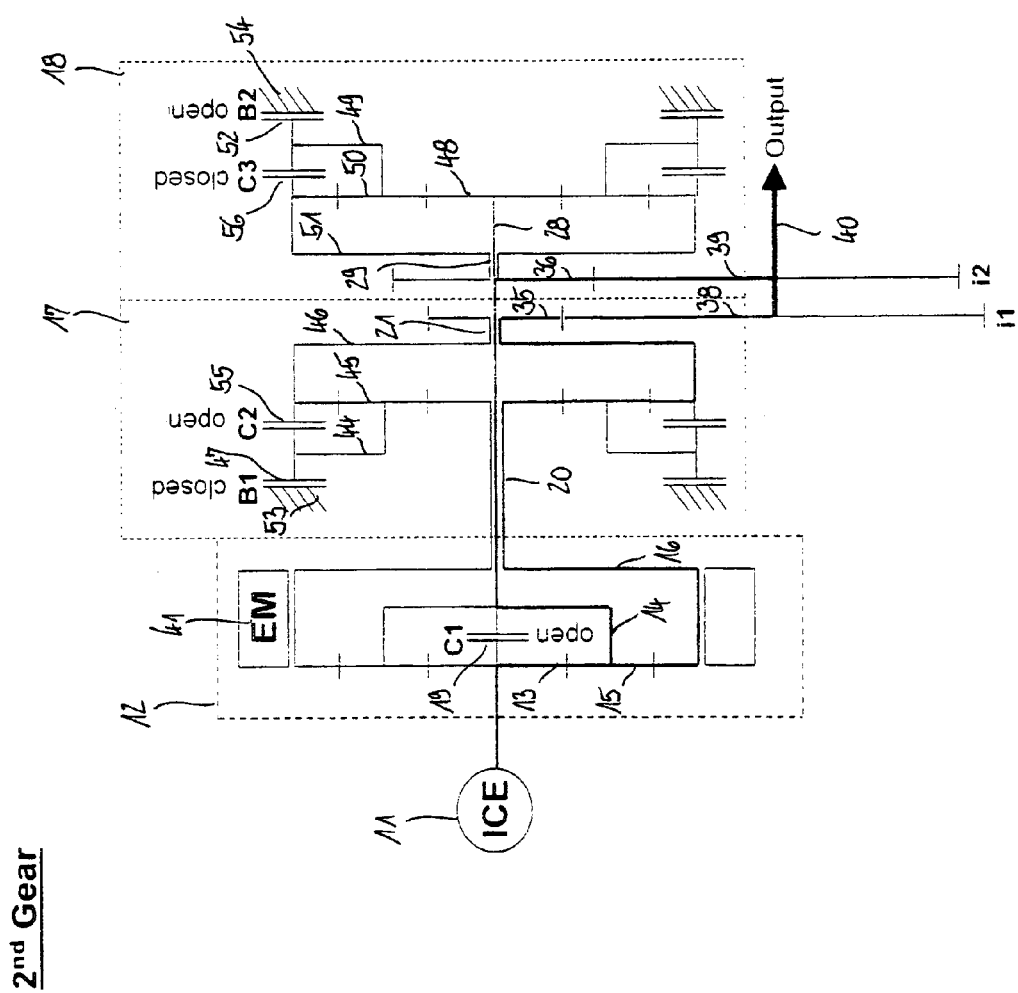
FIG. 12 is the gearbox diagram according to FIG. 10 in the $2^{nd}$ gear.

FIG. 12 shows the gear shift position for the second gear. The lock-up coupling 19 of the distribution gearbox 12 is open. Torque is transmitted from the main driving machine 11 via the sun gear 13 and the planetary carrier 14 to the input shaft 28 of the partial gear box 18 and torque is transmitted from the secondary driving machine 41 via the hollow gear 16 to the driveshaft 20 of the partial gearbox 17. At the second partial gearbox 18, the brake 52 is open and the lock-up coupling 56 is closed, so that the input shaft 28 is firmly blocked relative to the output shaft 29 which carries the output gear 36. At the first partial gearbox 17, the brake 47 is closed and the lock-up coupling is open, so that the output shaft 21 is driven at a transmission ratio relative to the input shaft 20, and also the output gear 35. The speed ratio of the output gears 36, 35 determines the differential movement in the distribution gearbox 12. Both output gears 35, 36 introduce torque into the driven shaft 40.

Figure 13:
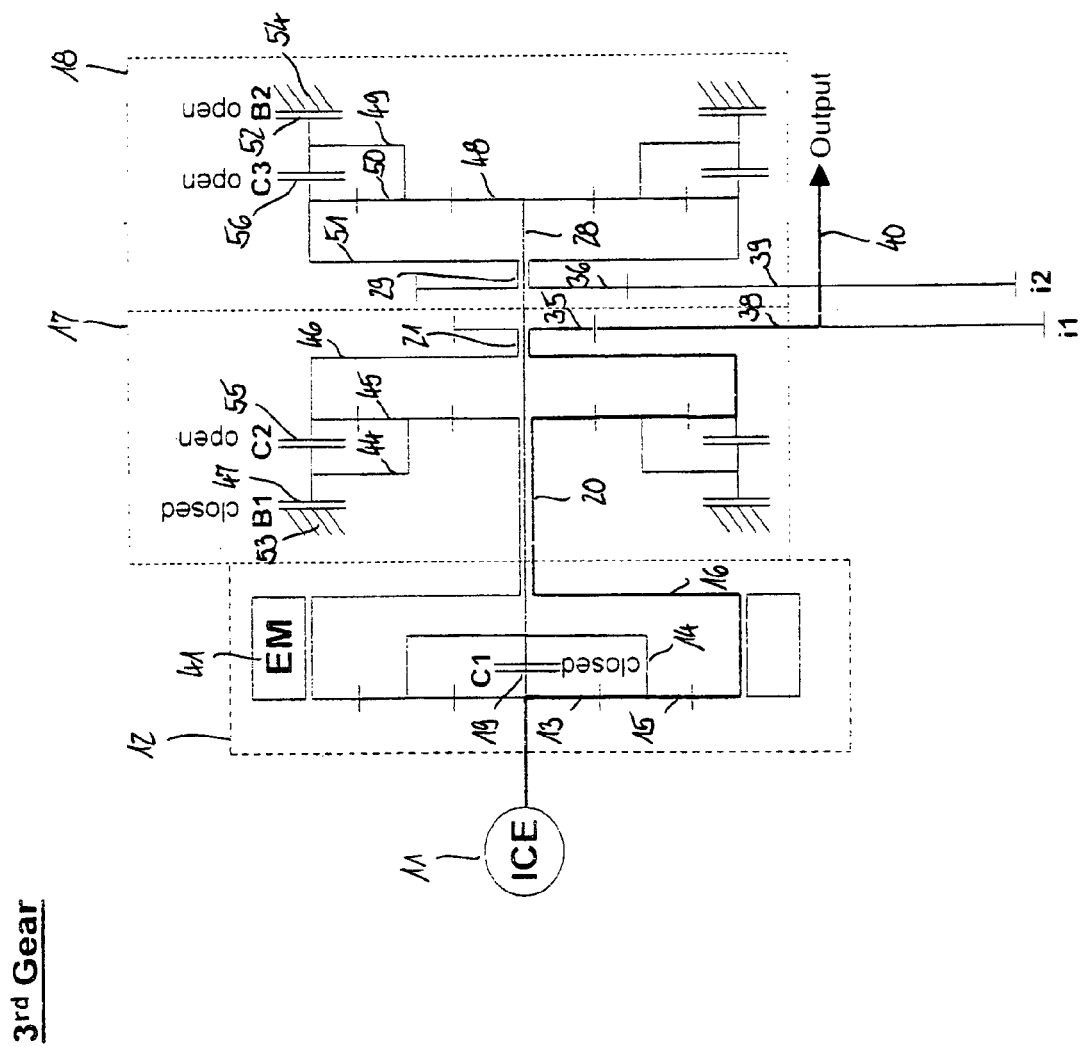
FIG. 13 is the gearbox diagram according to FIG. 10 in the $3^{rd}$ gear.

FIG. 13 shows the gear shift condition of the third gear. The lock-up coupling 19 of the distribution gearbox 12 is closed. The distribution gearbox acts as a rigid through-drive and drives the input shaft 20 and the input shaft 28 at identical speeds. For this reason, the partial gearbox 18 is released by opening the lock-up coupling 56 as well as the brake 52 (open/open). The output gear 36 on the output shaft 29 is thus able to rotate freely. Therefore, torque is transmitted from both the main driving machine 11 and the secondary driving machine 41 entirely via the input shaft 20 to the first partial gearbox 17 at which the lock-up coupling 55 is open and the brake 47 is closed. The partial gearbox 17 thus acts as a reduction stage, so that the output shaft 21 with the output gear 35 is driven at a reduced speed relative to the input shaft 20. Only the output gear 35 introduces torque into the driven gear 38 of the driven shaft 40.

Figure 14:
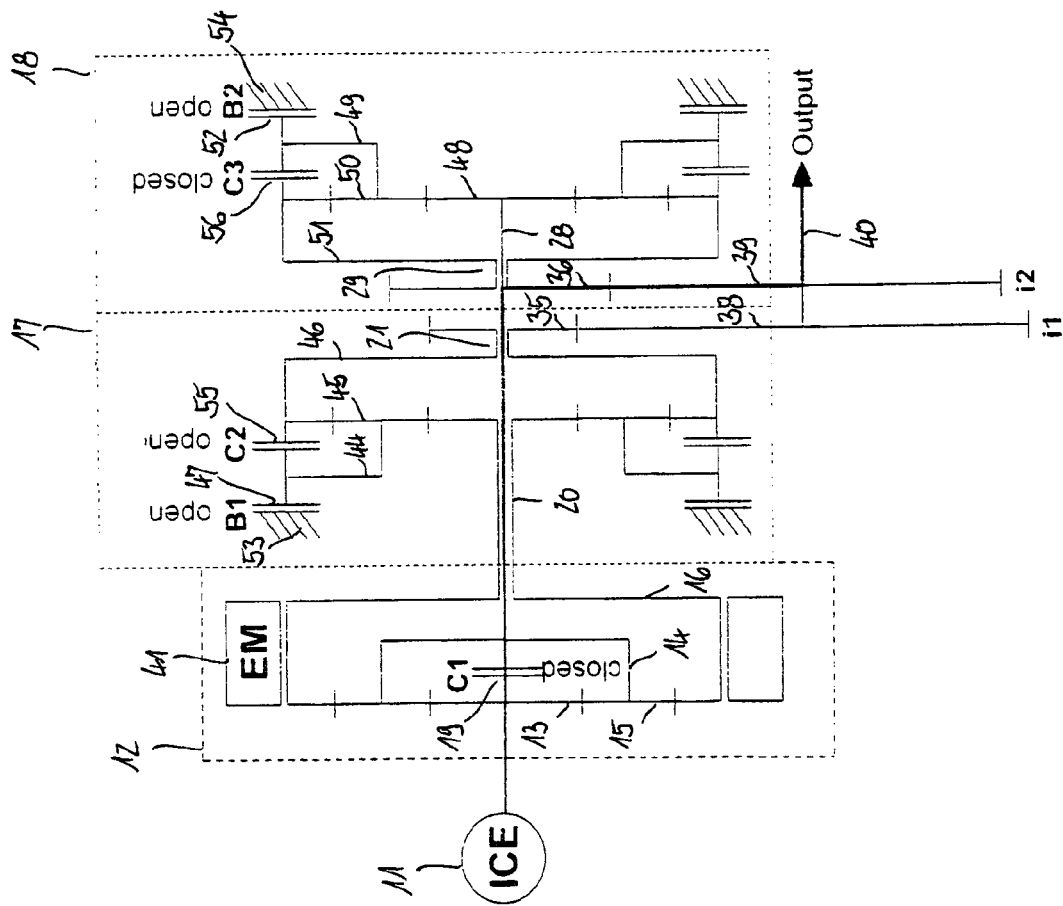
FIG. 14 is the gearbox diagram according to FIG. 10 in the $4^{th}$ gear.

FIG. 14 shows the gear shift condition of the fourth gear. The lock-up coupling 19 of the distribution gearbox 12 is closed. The distribution gearbox acts as a rigid through-drive and drives the input shaft 20 and the input shaft 28 at identical speeds. For this reason, the partial gearbox 17 is released by opening the lock-up coupling 55 as well as the brake 47 (open/open). The output gear 35 on the output shaft 21 is thus able to rotate freely. Therefore, torque is transmitted from both the main driving machine 11 and the secondary driving machine 41 entirely via the input shaft 28 to the second partial gearbox 18 at which the brake 52 is open and the lock-up coupling is closed. The partial gearbox 18 thus acts as a direct through-drive, so that the output shaft 29 with the output gear 36 is driven at the same speed as the input shaft 28. Only the output gear 36 introduces torque into the driven gear 39 of the driven shaft 40.

Figure 15:
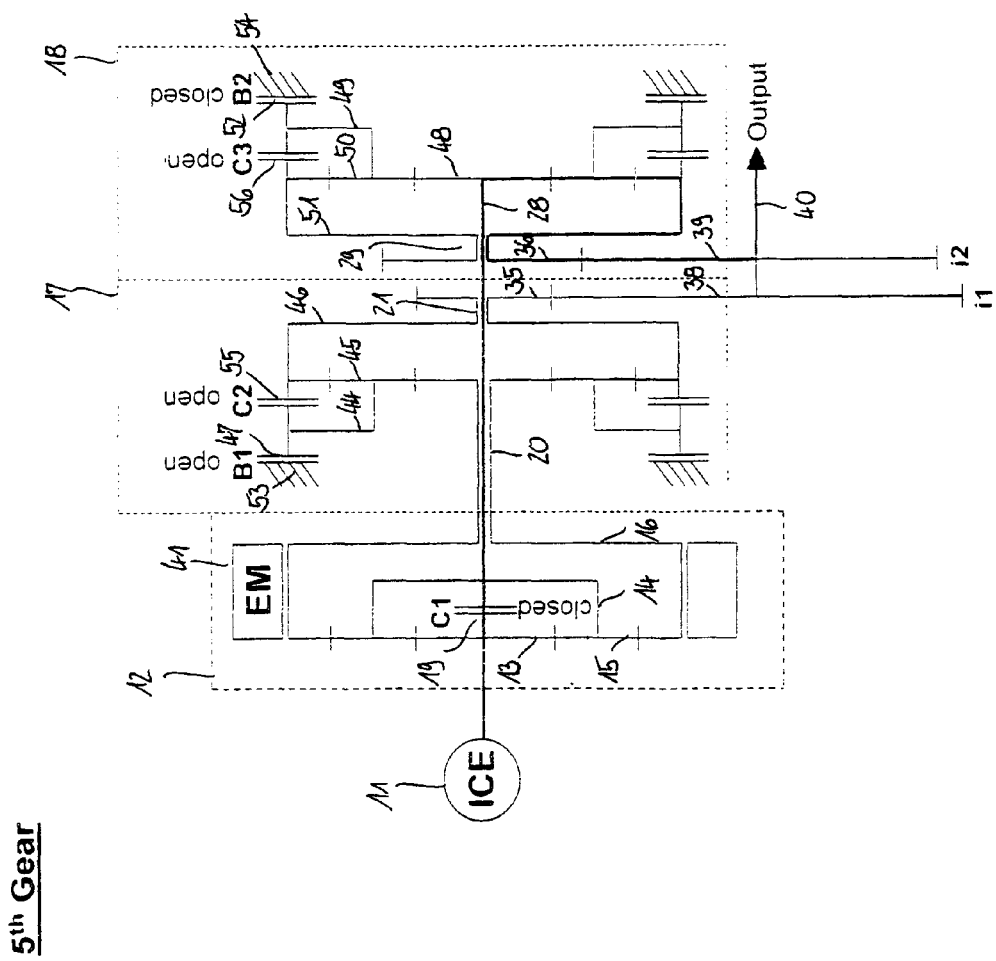
FIG. 15 is the gearbox diagram according to FIG. 10 in the $5^{th}$ gear.

FIG. 15 shows the gear shift condition of the fifth gear. The lock-up coupling 19 of the distribution gearbox 12 is closed. The distribution gearbox acts as a rigid through-drive and drives the input shaft 20 and the input shaft 28 at identical speeds. For this reason, the partial gearbox 17 is released by opening the lock-up coupling 55 as well as the brake 47 (open/open). The output gear 35 on the output shaft 21 is thus able to rotate freely. Therefore, torque is transmitted from both the main driving machine 11 and the secondary driving machine 41 entirely via the input shaft 28 to the second partial gearbox 18 at which the lock-up coupling 56 is open and the brake 52 is closed. The partial gearbox 18 thus acts as a reduction stage, so that the output shaft 29 with the output gear 36 is driven at a reduced speed relative to the input shaft 28. Only the output gear 36 introduces torque into the driven gear 38 of the driven shaft 40.

Figure 16:
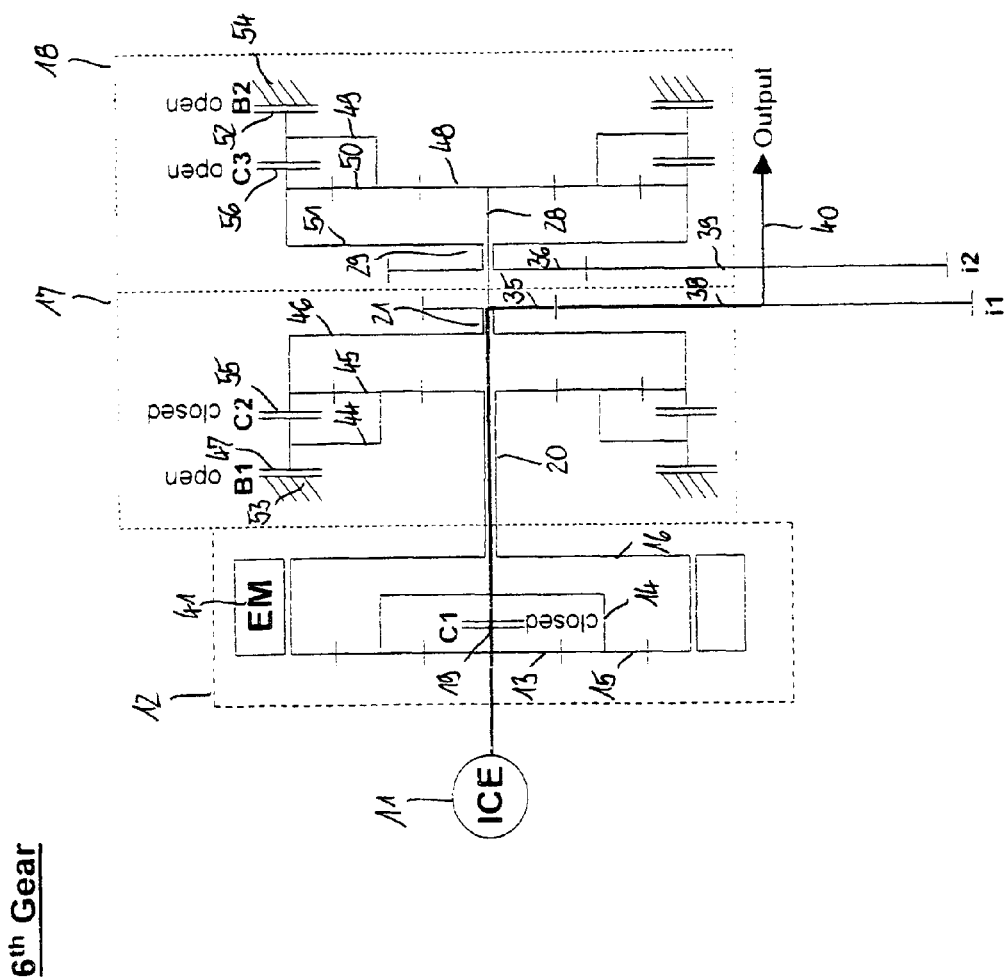
FIG. 16 is the gearbox diagram according to FIG. 10 in the $6^{th}$ gear.

FIG. 16 shows the gear shift condition of the sixth gear. The lock-up coupling 19 of the distribution gearbox 12 is closed. The distribution gearbox acts as a rigid through-drive and drives the input shaft 20 and the input shaft 28 at identical speeds. For this reason, the partial gearbox 18 is released by opening the lock-up coupling 56 as well as the brake 52 (open/open). The output gear 36 on the output shaft 29 is thus able to rotate freely. Therefore, torque is transmitted from both the main driving machine 11 and the secondary driving machine 41 entirely via the input shaft 20 to the first partial gearbox 17 at which the brake 47 is open and the lock-up coupling is closed. The partial gearbox 17 thus acts as a direct through-drive, so that the output shaft 21 with the output gear 35 is driven at the same speed as the input shaft 20. Only the output gear 35 introduces torque into the driven gear 38 of the driven shaft 40.

Figure 17:
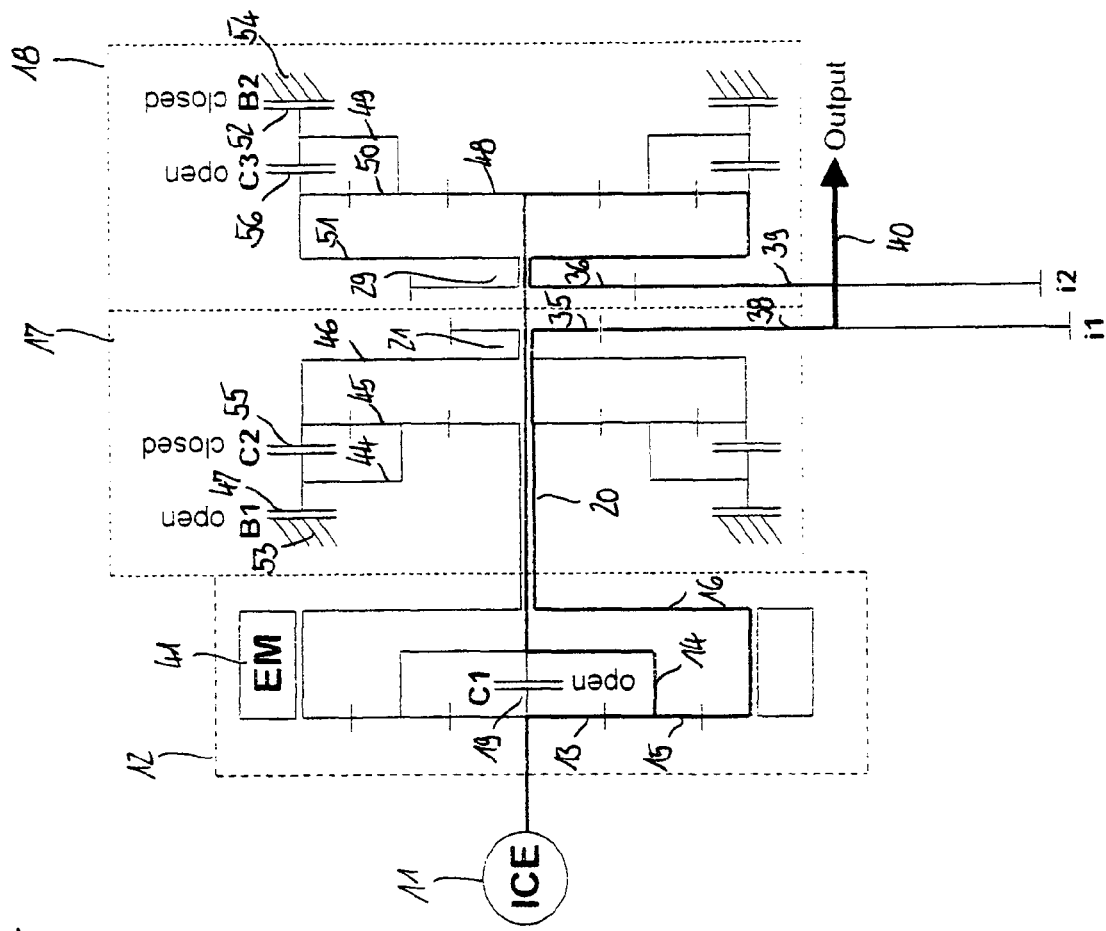
FIG. 17 is the gearbox diagram according to FIG. 10 in the $7^{th}$ gear.

FIG. 17 shows the gear shift position for the seventh gear. The lock-up coupling 19 of the distribution gearbox 12 is open. Torque is transmitted from the main driving machine 11 via the sun gear 13 and the planetary carrier 14 to the input shaft 28 of the partial gear box 18 and torque is transmitted from the secondary driving machine 41 via the hollow gear 16 to the driveshaft 20 of the partial gearbox 17. At the first partial gearbox 17, the brake 47 is open and the lock-up coupling 55 is closed, so that the input shaft 20 is firmly blocked relative to the output shaft 21 which drives the output gear 35. At the second partial gearbox 18, the brake 52 is closed and the lock-up coupling 56 is open, so that the output shaft 29 is driven at a transmission ratio relative to the input shaft 28, and also the output gear 36. The speed ratio of the output gears 36, 35 determines the differential movement in the distribution gearbox 12. Both output gears 35, 36 introduce torque into the driven shaft 40.

FIG. 18 shows the gear shift position for the eighth gear. The lock-up coupling 19 of the distribution gearbox 12 is open. Torque is transmitted from the main driving machine 11 via the sun gear 13 and the planetary carrier 14 to the input shaft 28 of the partial gearbox 18, and torque is transmitted from the secondary driving machine 41 via the hollow gear 16 to the input shaft 20 of the partial gearbox 17. At the partial gearbox 18, the brake 52 is open and the lock-up coupling 56 is closed, so that the input shaft 28 is firmly blocked relative to the output shaft 29 which drives the output gear 36. At the first partial gearbox 17, the lock-up coupling 55 is closed and the brake 47 is open, so that the output shaft 21 is driven at the same speed as the input shaft 20, and also the output gear 35. The speed ratio of the output gears 36, 35 determines the differential movement in the distribution gearbox 12. Both driven gears 35, 36 introduce torque into the driven shaft 40.

In this case, too, to illustrate the reverse gear, the direction of rotation of the secondary driving machine 41 can be reversed.

The invention is not restricted to the illustrative examples or embodiments described above. The examples or embodiments are not intended as limitations on the scope of the invention. Methods, processes, apparatus, compositions, and the like described herein are exemplary and not intended as limitations on the scope of the invention. Changes therein and other uses will occur to those skilled in the art. The scope of the invention is defined by the scope of the claims.

I claim:

1. A drive system with an 8-gear gearbox for a motor vehicle with a driving machine, more particularly an internal combustion engine, the drive system comprising: a distribution gearbox (12) which is drivingly connected to the driving machine (11) and having three members, as well as two 2-gear partial gearboxes (17, 18), wherein a first member of the distribution gearbox (12) is drivingly connected to the internal combustion engine (11) and a second member and a third member of the distribution gearbox (12) are each connected to an input shaft (20, 28) of one of the two 2-gear partial gearboxes (17, 18) and wherein, between two of said members of the distribution gearbox (12), there is provided a switchable bridging coupling (19) and wherein one output element of each of the two 2-gear partial gearboxes (17, 18) is permanently drivingly connected to a driven gear (38, 39) or to a driven shaft (40) and a first of the two 2-gear partial gearboxes (17) constitutes a planetary gearbox with the following members: a sun gear (43), a planetary carrier (44) with at least one planetary gear (45) and a hollow gear (46), wherein a first member of said members of the planetary gearbox is connected to the input shaft (20), a second member of said members of the planetary gearbox is connected to an output shaft (21) and a third member of said members of the planetary gearbox is connected to a brake disc/brake carrier which can be fixed relative to a stationary part (53), wherein a switchable bridging coupling (55) is provided between two of said members of the planetary gearbox.

2. The drive system according to claim 1,
characterised in
that the driving machine (11) and the first member of the distribution gearbox (12) are permanently drivingly connected and that one of the two other members of the distribution gearbox (12) is drivingly connected to a secondary driving machine (41) (hybrid drive system).

3. The drive system according to claim 1,
characterised in
that the distribution gearbox (12) is a planetary gearbox with members in the form of one sun gear (13), one planetary carrier (14) with at least one planetary gear (15) and one hollow gear (16).

4. The drive system according to claim 3,
characterised in
that the driving machine (11) is connected to the sun gear (22) of the planetary gearbox (12), the planetary carrier (23) to an input shaft of the one 2-gear partial gearbox (18) and the hollow gear (25) to an input shaft of the other 2-gear partial gearbox (17).

5. The drive system according to claim 1,
characterised in
that one of the input shafts (28) is an inner shaft and the other one of the input shafts (20) is a hollow shaft extending coaxially relative to said inner shaft.

6. The drive system according to claim 1,
characterised in
that the driving machine (11) is an internal combustion engine.

7. The drive system according to claim 2,
characterised in
that the secondary driving machine (41) is an electric motor.

8. The drive system according to claim 1,
characterised in
that the second 2-gear partial gearbox (18) constitutes a planetary gearbox with the following members: a sun gear (48), a planetary carrier (49) with at least one planetary gear (50) and a hollow gear (51), wherein one of the members is connected to the input shaft (28), one of the members to an output shaft (29) and the third member to a brake disc/brake carrier which can be fixed relative to a stationary part (54), wherein a switchable bridging coupling (56) is provided between two of the members of the planetary gearbox.

9. The drive system according to claim 8,
characterised in
that the input shaft (20, 28) is connected to the sun gear (43, 48) and the output shaft (21, 29) to the hollow gear (46, 51).

10. The drive system according to claim 9,
characterised in
that the one of the input shafts (28) is an inner shaft and the other one of the input shafts (20) a hollow shaft extending coaxially relative to the input shaft (28).

11. The drive system according to claim 10,
characterised in
that, via a separate gear stage (35, 38; 36, 39) the output shafts (21, 29) of the planetary gearbox are connected at a fixed gear ratio to a driven shaft (40).

12. The drive system according to claim 11,
characterised in
a starting coupling is provided between the driving machine (11) and the first member of the planetary gearbox (12).

* * * * *